United States Patent
Lee et al.

(10) Patent No.: US 7,906,869 B2
(45) Date of Patent: Mar. 15, 2011

(54) OUTLET APPARATUS WITH POWER CLASSIFICATION MANAGEMENT

(75) Inventors: Yu-Lung Lee, Nanjhuang Township, Miaoli County (TW); Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 12 days.

(21) Appl. No.: 12/320,391

(22) Filed: Jan. 26, 2009

(65) Prior Publication Data
US 2010/0096925 A1 Apr. 22, 2010

(30) Foreign Application Priority Data
Oct. 22, 2008 (TW) .............................. 97140407 A

(51) Int. Cl.
*H02B 13/00* (2006.01)
*H02J 3/00* (2006.01)
(52) U.S. Cl. ........................................... 307/40; 307/38
(58) Field of Classification Search ............... 307/38, 307/40
See application file for complete search history.

(56) References Cited

U.S. PATENT DOCUMENTS

| | | | | |
|---|---|---|---|---|
| 5,424,903 A * | 6/1995 | Schreiber | ..................... | 361/166 |
| 5,563,455 A * | 10/1996 | Cheng | ........................... | 307/41 |
| 6,211,581 B1 * | 4/2001 | Farrant | ........................... | 307/117 |
| 6,396,166 B1 * | 5/2002 | Kim | ................................. | 307/38 |
| 6,509,655 B1 * | 1/2003 | Wang | ............................... | 307/31 |
| 6,528,902 B1 * | 3/2003 | Barton | ........................... | 307/39 |
| 6,603,221 B1 * | 8/2003 | Liu | ................................. | 307/125 |
| 6,666,712 B1 * | 12/2003 | Kramer | ......................... | 439/501 |
| 6,741,442 B1 * | 5/2004 | McNally et al. | ............. | 361/166 |
| 6,759,762 B2 * | 7/2004 | Barton | ........................... | 307/39 |
| 6,759,763 B2 * | 7/2004 | Barton | ........................... | 307/39 |
| 7,132,763 B2 * | 11/2006 | Rendic | ......................... | 307/31 |
| 7,154,402 B2 * | 12/2006 | Dayoub | ........................ | 340/628 |
| 7,193,335 B2 * | 3/2007 | Palmer et al. | ................... | 307/39 |
| 7,315,097 B2 * | 1/2008 | Tajika | ........................... | 307/131 |
| 7,663,866 B2 * | 2/2010 | Lee et al. | ...................... | 361/601 |
| 7,701,086 B2 * | 4/2010 | McClurkan | .................... | 307/38 |
| 2009/0146494 A1 * | 6/2009 | Mori et al. | ..................... | 307/38 |
| 2009/0215319 A1 * | 8/2009 | Gandhi | ......................... | 439/654 |
| 2010/0079001 A1 * | 4/2010 | Lee et al. | ........................ | 307/40 |
| 2010/0164284 A1 * | 7/2010 | Lee et al. | ........................ | 307/38 |
| 2010/0164299 A1 * | 7/2010 | Lee et al. | ...................... | 307/115 |

FOREIGN PATENT DOCUMENTS
WO    WO 2007064118 A1 *  6/2007
* cited by examiner

*Primary Examiner* — Jared J Fureman
*Assistant Examiner* — Adi Amrany
(74) *Attorney, Agent, or Firm* — Rosenberg, Klein & Lee

(57) ABSTRACT

An outlet apparatus with power classification management which receives a control signal from a far end remote controller, and comprises at least one socket, a communication module, and a microprocessor. Wherein the sockets may be classified into a plurality of socket groups, which include at least one uncontrollable socket group and at least one controllable socket group. The communication module receives the control signal, and the microprocessor is coupled with the communication module and the socket groups for respectively controlling the controllable socket groups with respect to providing power or not according to the control signal.

9 Claims, 4 Drawing Sheets

OUTLET APPARATUS WITH POWER CLASSIFICATION MANAGEMENT

BACKGROUND OF THE INVENTION

1. Field of the Invention

The present invention is related to an outlet apparatus with power classification management, especially to an outlet apparatus with power classification management which can be remotely controlled and provides various controlling sets of socket groups for different power supply requirements.

2. Description of Related Art

Referring to FIG. 1, which is a circuit block diagram of conventional remote controlled outlets. The conventional remote control outlets 1 receive a far end remote control signal S1 through an antenna 10 on a RF receiver 11, then the RF receiver 11 sends the remote control signal S1 to a decoder 12. The decoder 12 decodes the remote control signal S1, and sends the decoded remote control signal S2 to a microprocessor 13 for determination and confirming correctness. If there are errors in the decoded data S2, then the microprocessor 13 ignores the data, otherwise the microprocessor 13 issues and sends commands through a transistor driver 14 for driving a relay 15, making the contact switch 150 of the relay 15 close or open, and thus controls the on and off of electrical appliances 2. In addition, between the electrical appliances 2 and power AC, there is a manual switch 16 parallel connecting with the contact switch 150 of the relay 15, and the manual switch 16 may provide manual operation of the remote control outlets 1.

As described, currently conventional remote control outlets 1 are remotely controlled by only one remote controller (not shown), and the operation can merely control the outlets with respect to provide power to all of the electrical appliances 2 or not. However, this kind of simple remote control is not flexible enough to satisfy the requirements of all users.

Generally in a family, used electrical appliances include: A. some electrical appliances need continuous power supply, such as refrigerators, drinking fountains, etc., B. some electrical appliances require power according to the operation of users, such as screens, electric fans, etc., C. and in addition, power usage of some electrical appliance sets has a sequential order, such as a screen and a computer host, an electric fan and an air conditioner, etc. The conventional remote control outlets 1 described can not satisfy all of the power requirements.

Therefore, there is a need for inventing a remote controlled outlet apparatus which supplies power according to different power usage requirements.

SUMMARY OF THE INVENTION

The present invention introduces an outlet apparatus with power classification management, receiving a remote control signal from a far end remote controller, and providing and controlling various socket groups for different power requirements according to the remote control signal.

A preferred embodiment of the present invention of an outlet apparatus with power classification management, which receives a remote control signal from a far end remote controller, and the outlet apparatus comprises at least one socket, a communication module, and a microprocessor, wherein the sockets may be classified into a plurality of socket groups, which comprise at least one uncontrollable socket group and at least one controllable socket group. The communication module receives the control signal, and the microprocessor is coupled with the communication module and the controllable socket groups for respectively controlling the controllable socket groups with respect to provide power or not.

The preferred embodiment of the present invention of an outlet apparatus with power classification management, which classifies the socket groups into three groups, represented by three different colors respectively, including: color A representing the conditionally power on/off remote controlled socket groups, color B representing the directly power on/off remote controlled socket groups, and color C representing the uncontrollable and continuously power providing socket groups.

Thus, the preferred embodiment of the present invention of an outlet apparatus with power classification management may let the users clearly know the desired level of control within the outlet apparatus, provides and controls various socket groups for different power requirements, and further solves the problems of the conventional remote control outlets which are not flexible enough in supplying power.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF PREFERRED EMBODIMENTS

Figure 1:
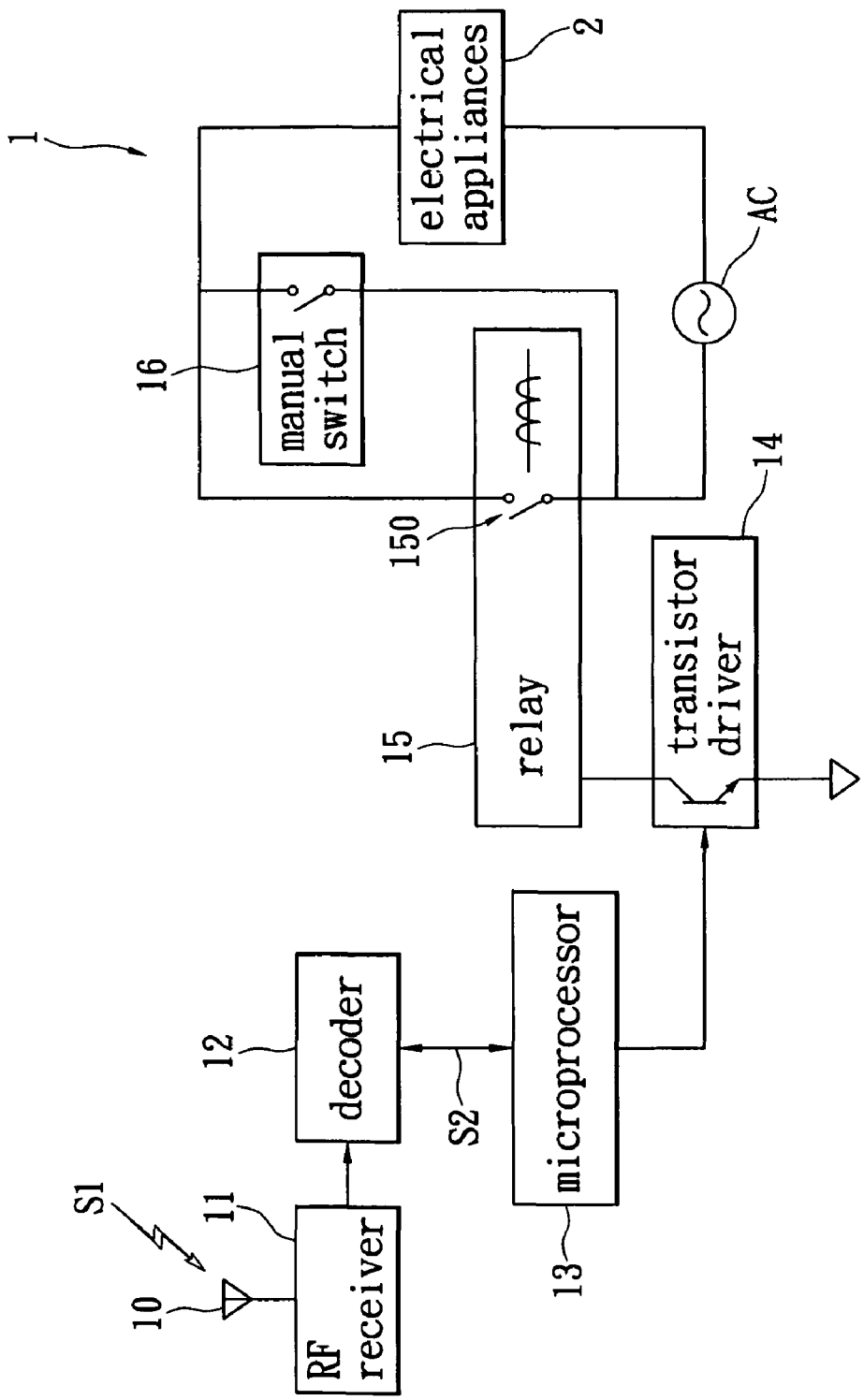
FIG. 1 is a circuit block diagram of the conventional remote control outlets.
Figure 2:
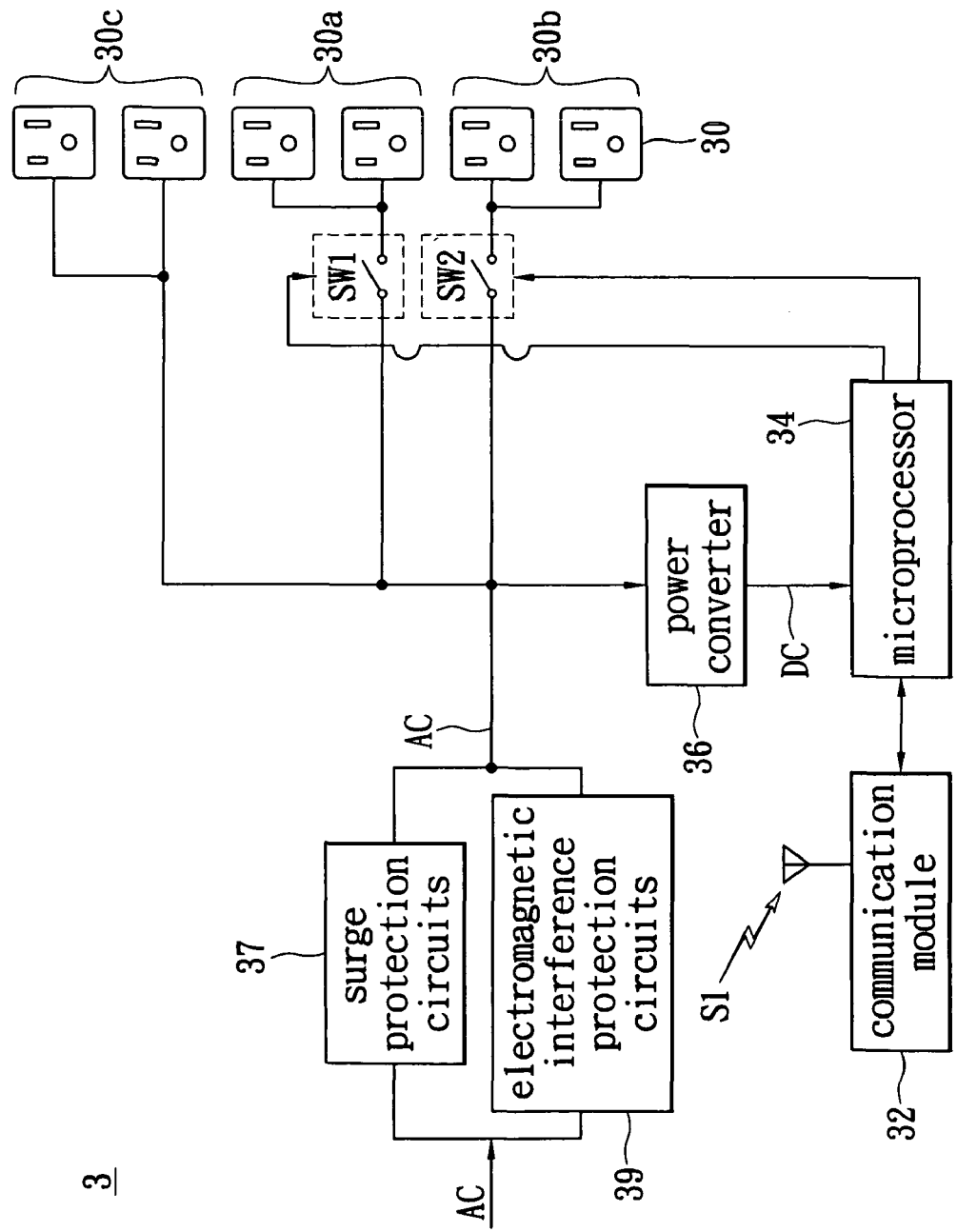
FIG. 2 is a circuit block diagram of a preferred embodiment of an outlet apparatus with power classification management according to the present invention.

Referring to FIG. 2, which is a circuit block diagram of a preferred embodiment of an outlet apparatus with power classification management according to present invention. The outlet apparatus 3 with power classification management comprises at least one socket 30, a communication module 32, and a microprocessor 34. The sockets 30 may be classified into a plurality of socket groups, in the preferred embodiment, there are three socket groups 30a, 30b, and 30c, but the preferred embodiment is not intended to limit the scope of the claims of the present invention. In the preferred embodiment, the socket group 30a and 30b are controllable socket groups, and the socket group 30c is an uncontrollable socket group, which is an uninterrupted power socket group.

Referring to FIG. 2 again, the communication module 32 is a radio transceiver module, for receiving a control signal S1 from a far end remote controller (not shown) by radio frequency (RF) signals and transmitting the control signal S1 to the microprocessor 34. The microprocessor 34 is coupled with the communication module 32 and the controllable socket groups 30a and 30b, for respectively controlling the controllable socket groups 30a and 30b with respect to providing power to loads according to the control signal S1.

Referring to FIG. 2 again, the outlet apparatus 3 with power classification management further comprises a power plug (not shown), switches SW1 and SW2, and a power converter 36. Therein the power plug receives alternating current power AC, and the power converter 36 is coupled with the power plug and the microprocessor 34, for converting the alternating current power AC to direct power DC and providing to the microprocessor 34.

The switches SW1, SW2 are series connected between the power plug and the controllable socket group 30a, 30b respectively, and are controlled by the microprocessor 34. The microprocessor 34 controls the switching of the switches SW1 and SW2 according to the control signal S1, for respectively providing power to loads. The switches may be a relay or a triac.

The following paragraph is for interpreting the classification controlling. After the microprocessor 34 decodes the control signal S1, it may control the switch SW1 close or open alone, thus controls the controllable socket group 30a with respect to provide power to loads or not. Alternatively, after the microprocessor 34 decodes the control signal S1, it may simultaneously control the switches SW1 and SW2 close or open, thus controls the controllable socket groups 30a and 30b with respect to provide power to loads or not.

Referring to FIG. 2 again, for the capability of preventing the occurrence of surges and electromagnetic interferences, the outlet apparatus 3 with power classification management according to the present invention further comprises a surge protection circuit 37, which is series connected between the power plug and the switches SW1, SW2, and between the power plug and the uncontrollable socket group 30c. At the same time, the outlet apparatus 3 with power classification management according to the present invention further comprising an electromagnetic interference protection circuit 39, which is series connected between the power plug and the switches SW1, SW2, and between the power plug and the uncontrollable socket group 30c.

Figure 3:
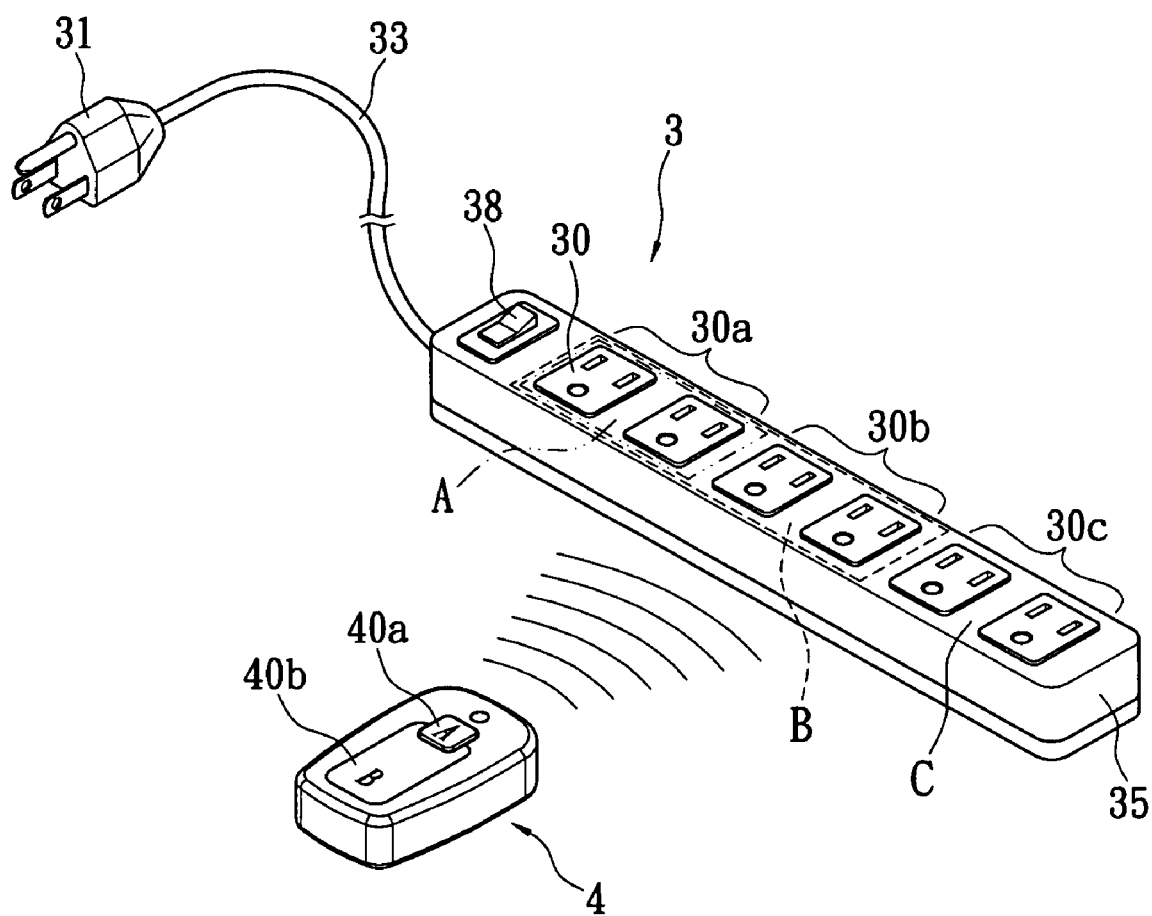
FIG. 3 is a device application diagram of a preferred embodiment of an outlet apparatus with power classification management according to the present invention.

Referring to FIG. 2 and corresponding to FIG. 3, which is a device application diagram of a preferred embodiment of an outlet apparatus with power classification management according to the present invention. In FIG. 3, the outlet apparatus 3 with power classification management according to the present invention is described in the form of electrical extended line type, and of course, the outlet apparatus 3 with power classification management according to the present invention may also be used in the form of wall-tape type. Thus, FIG. 3 is just the preferred embodiment of the present invention, and is not intended to limit the scope of claims according to present invention.

Referring to FIG. 3 again, the outward appearance of outlet apparatus 3 with power classification management comprises a power plug 31, an electrical extended line 33, and a body 35, wherein there are a plurality of sockets 30 and a switch 38 on the body 35. All of the sockets 30 on the body 35 may be controlled by the switch 38. When turning on the switch 38, alternating current is flowing from power plug 31 through the electrical extended line 33.

Referring to FIG. 3 and corresponding to FIG. 2, the outlet apparatus 3 with power classification management uses different colors for respectively representing the power management of the socket groups 30a, 30b, and 30c on the outlet apparatus 3. In the preferred embodiment, the outlet apparatus 3 with power classification management is divided into three sections, indicated by three colors: color A, representing the conditionally power on/off remote controlled socket groups, color B representing the directly power on/off remote controlled socket groups, and color C representing the uncontrollable socket groups. Wherein color A covers the socket group 30a, color B covers the socket groups 30a and 30b, and color C covers the socket group 30c. The classification described may also be represented by different numbers, different lines, or different texture etchings.

Referring to FIG. 3 and corresponding to FIG. 2 again, there is a remote controller 4 which communicate with the outlet apparatus 3 by RF wireless transmission, and the operation keys 40a, 40b on the remote controller 4 may remotely control the socket groups 30a, 30b on the outlet apparatus 3 respectively. That is, by pressing the operation key 40a on the remote controller 4, the socket group 30a of color A on the outlet apparatus 3 can be remotely controlled.

Alternatively, the socket group 30a of color A is included by the socket group 30b of color B according to the grouping conception. That is, by pressing the operation key 40b on the remote controller 4, the socket groups 30a and 30b can be remotely controlled.

Referring to FIG. 3 again, in common family application, the outlet apparatus 3 with power classification management can solve the inflexibility problem of the conventional remote controlled outlet. Users can plug the appliances which need continuous power supply such as refrigerator and drinking fountain into the socket group 30c on the outlet apparatus in order to obtaining continuous power.

In addition, users may plug a television in the socket group 30a of color A in the outlet apparatus 3, and plug a video player in the socket group 30b of color B in the outlet apparatus 3. In the meanwhile, users may control the television alone to turn on or off by the remote controller 4, or may control the television and video player simultaneously to turn on or off by the remote controller 4. Therefore, the users may control the television and video player conveniently and flexibly.

Referring to FIG. 3 and corresponding to FIG. 2 again, the color of the operation key 40a on the remote controller 4 is the same as color A on the outlet apparatus 3 with power classification management. Similarly, the color of the operation key 40b on the remote controller 4 is the same as color B on the outlet apparatus 3 with power classification management. Therefore, the users can clearly know the desired level of control on the outlet apparatus 3 with power classification management by looking at the remote controller 4. In addition, the outlet apparatus 3 with power classification management may be designed as different types according to user requirements or applications, for example, strip type, wall-tap type, block type, rackmount type, or desktop type.

Figure 4:
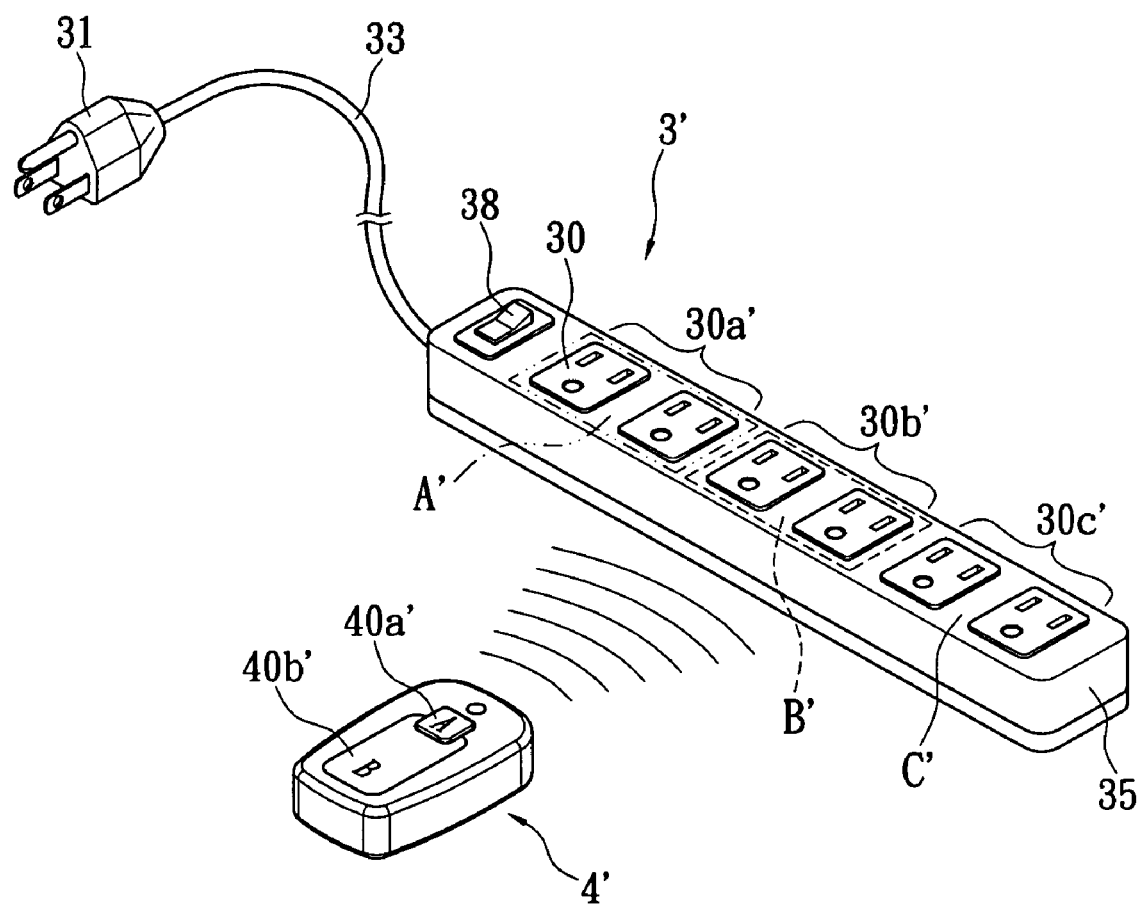
FIG. 4 is a device application diagram of another preferred embodiment of an outlet apparatus with power classification management according to the present invention.

Corresponding to FIG. 3 and referring to FIG. 4, which is a device application diagram of another preferred embodiment of an outlet apparatus with power classification management according to the present invention. The same components in FIG. 3 and FIG. 4 are represented by the same symbols. The circuits operation flow and the purposes achieved of FIG. 4 is the same as FIG. 3, the main difference is: the socket groups 30a', 30b', and 30c' on an outlet apparatus 3' in FIG. 4 are respectively arranged into three colored sections, with a color A' and a color B' representing the conditionally power on/off remote controlled socket groups, and a color C' representing the uncontrollable and continuously power providing socket groups. Wherein color A' covers the socket group 30a', color B' covers the socket group 30b', and color C' covers the socket group 30c'. That is, the socket groups 30a', 30b', and 30c' of outlet apparatus 3' which is shown in FIG. 4 are covered by color A', B', and C' respectively without multiple grouping.

Similarly, the color of the operation key 40b' on the remote controller 4' is the same as color B' on the outlet apparatus 3' with power classification management. Thus, by pressing the buttons 40*a*' and 40*b*' of the remote controller 4', the socket groups 30*a*' and 30*b*' can be remotely controlled respectively.

Therefore, users can singularly and remotely control the power provision of the electrical appliances, which are plugged in the socket group 30*a*' and 30*b*' of outlet apparatus 3' with power classification management.

Besides different colors, the described outlet apparatus 3' with power classification management may use different numbers, different lines, or different texture etchings to represent the classification.

To sum up, the preferred embodiment of the outlet apparatus with power classification management according to the present invention receives the remote control signal from a remote controller, for controlling different socket groups to provide power to loads with different power usage requirement according to the remote control signal. The socket groups on the outlet apparatus with power classification management are arranged into three sections and are represented by different colors, such as: color A representing the conditionally power on/off remote controlled socket groups, color B representing the directly power on/off remote controlled socket groups, and color C representing the uncontrollable and continuously power providing socket groups.

Therefore, the preferred embodiment of the outlet apparatus with power classification management according to the present invention lets the users clearly know the desired level of control, provides and controls various socket groups for loads with different power requirements, and further solves the problem of the conventional remote control outlets consisting of insufficient flexibility concerning power supply.

The description above only illustrates specific embodiments and examples of the invention. The invention should cover various modifications and variations made to the structures and operations described herein, and they still fall within the scope of the invention as defined in the following appended claims.

What is claimed is:

1. An outlet apparatus with power classification management, comprising:
   a remote control unit having a first operation key and a second operation key;
   at least three sockets, being classified into a plurality of socket groups, comprising a first controllable socket group, a second controllable socket group and an uncontrollable socket group wherein the first controllable group includes a first socket that is controllable by the first operation key, and the second controllable group includes the first socket and a second socket that are controllable by the second operation key;
   a communication module;
   a microprocessor, which is coupled with the communication module, the first controllable socket group, and the second controllable socket group, for respectively controlling the first controllable socket group and the second controllable socket group in terms of whether or not to provide electric power;
   wherein when the first operation key is pressed, the remote control unit issues a first control signal to the communication module in order to control operations of the first socket in the first controllable socket group, and when the second operation key is pressed, the remote control unit issues a second control signal to the communication module in order to control operations of the first socket and the second socket in the second controllable socket group.

2. The outlet apparatus with power classification management as in claim 1, further comprising at least a switch, which is connected in series with corresponding controllable socket groups, is controlled by the microprocessor as to whether or not to conduct an alternating current to the controllable socket groups.

3. The outlet apparatus with power classification management as in claim 2, further comprising a power converter, which is coupled with the microprocessor, for converting the alternating current to a direct current, and for providing the direct current to the microprocessor.

4. The outlet apparatus with power classification management as in claim 3, further comprising a surge protection circuit, which is coupled with the sockets.

5. The outlet apparatus with power classification management as in claim 4, further comprising an electromagnetic interference protection circuit, which is coupled with the sockets.

6. The outlet apparatus with power classification management as in claim 1, wherein the first control signal and the second control signal are radio frequency (RF)-based control signals.

7. The outlet apparatus with power classification management as in claim 1, wherein the socket groups are represented by colors, numbers, lines, or texture etchings.

8. The outlet apparatus with power classification management as in claim 7, wherein the remote control unit controls no operations of sockets in the uncontrollable socket group.

9. The outlet apparatus with power classification management as in claim 1, further comprising utilizing a first color to represent the first controllable socket group, a second color to represent the the second controllable socket group, and a third color to represent the uncontrollable socket group.

* * * * *